United States Patent
Obara et al.

(10) Patent No.: US 10,542,485 B2
(45) Date of Patent: Jan. 21, 2020

(54) BASE STATION

(71) Applicant: NTT DOCOMO, INC., Tokyo (JP)

(72) Inventors: Tatsunori Obara, Tokyo (JP); Satoshi Suyama, Tokyo (JP); Tatsuki Okuyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/082,733

(22) PCT Filed: Mar. 8, 2017

(86) PCT No.: PCT/JP2017/009196
§ 371 (c)(1),
(2) Date: Sep. 6, 2018

(87) PCT Pub. No.: WO2017/154968
PCT Pub. Date: Sep. 14, 2017

(65) Prior Publication Data
US 2019/0075515 A1    Mar. 7, 2019

(30) Foreign Application Priority Data
Mar. 11, 2016 (JP) .................... 2016-048751

(51) Int. Cl.
*H04B 7/06* (2006.01)
*H04W 48/16* (2009.01)
(Continued)

(52) U.S. Cl.
CPC .......... *H04W 48/16* (2013.01); *H04B 7/0456* (2013.01); *H04B 7/0617* (2013.01); *H04L 5/0048* (2013.01); *H04W 88/08* (2013.01)

(58) Field of Classification Search
CPC ..... H04W 48/16; H04W 88/08; H04W 16/28; H04L 5/0048; H04L 27/26; H04B 7/0617; H04B 7/0456; H04B 7/0413
See application file for complete search history.

(56) References Cited

U.S. PATENT DOCUMENTS

2005/0190105 A1* 9/2005 Ishizu ................. H04B 7/0617
                                                              342/383
2015/0049824 A1   2/2015 Kim et al.
(Continued)

OTHER PUBLICATIONS

NTT DOCOMO, INC.; "5G Radio Access: Requirements, Concept and Technologies"; DOCOMO 5G White Paper, Sep. 2014 (27 pages).

(Continued)

*Primary Examiner* — Mohamed A Kamara
(74) *Attorney, Agent, or Firm* — Osha Liang LLP

(57) ABSTRACT

A base station transmits first discovery signals in different transmission directions from the base station through beamforming; transmits, for one or more first transmission directions corresponding to one or more first discovery signals reported from the mobile station, second discovery signals in second transmission directions within a predetermined range from the first transmission direction; and, for transmitting the second discovery signal, transmits the second discovery signal by multiplying, by a correction precoding vector for adding, to the first transmission direction, a transmission angle difference between the first transmission direction within the predetermined range from the second discovery signal and a second transmission direction of the second discovery signal to be transmitted, and by performing beamforming for the second discovery signal to which the correction precoding vector is multiplied, using a first (Continued)

BASE STATION OF RELATED ART

MASSIVE MIMO BASE STATION weight matrix for beamforming in the first transmission direction within the predetermined range from the second discovery signal.

8 Claims, 16 Drawing Sheets

(51) Int. Cl.
*H04B 7/0456* (2017.01)
*H04L 5/00* (2006.01)
*H04W 88/08* (2009.01)

(56) References Cited

U.S. PATENT DOCUMENTS

2017/0117946 A1\* 4/2017 Lee ..................... H04B 7/0617
2017/0331533 A1\* 11/2017 Strong ................. H04B 7/0452
2019/0014510 A1\* 1/2019 Rune ................. H04W 36/0055

OTHER PUBLICATIONS

NTT DOCOMO; "5G Multi antenna technique," NTT DOCOMO Technical Journal, vol. 23., No. 4; Jan. 2016 (15 pages).
NTT DOCOMO; NTT DOCOMO Technical Journal, vol. 17., No. 4; Apr. 2016 (16 pages).
International Search Report issued in PCT/JP2017/009196 dated May 23, 2017 (8 pages).
Written Opinion issued in PCT/JP2017/009196 dated May 23, 2017 (3 pages).
Extended Eruopean Search Report issued in counterpart European Patent Application No. 17763308.8, dated Dec. 7, 2018 (9 Pages).

\* cited by examiner

BASE STATION OF RELATED ART

MASSIVE MIMO BASE STATION

HORIZONTAL DIRECTION 180° /10° ×
VERTICAL DIRECTION 180° /10° = 324 CANDIDATES

HORIZONTAL DIRECTION 180° /5° ×
VERTICAL DIRECTION 180° /5° = 1296 CANDIDATES

UNIFORM PLANAR ARRAY (UPA)

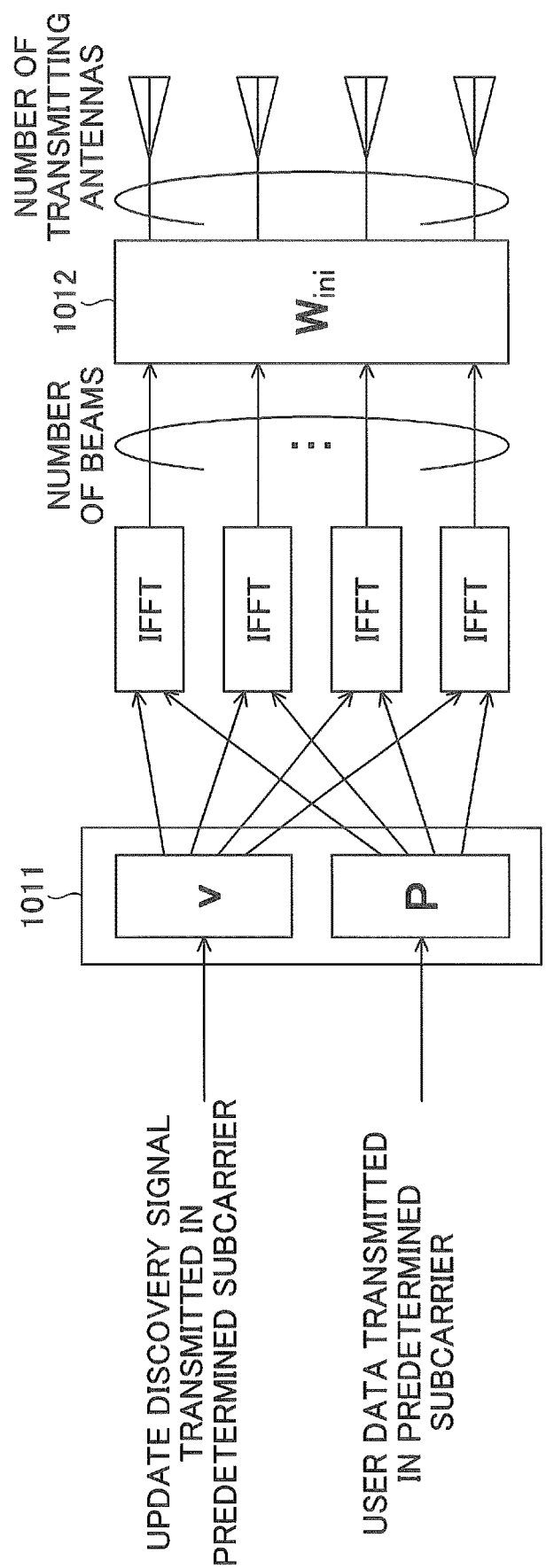

BASE STATION

TECHNICAL FIELD

The present invention relates to a base station.

BACKGROUND ART

In Long Term Evolution (LTE), in order to achieve a further increase in a system capacity, a further increase in a data transmission rate, and further reduction of latency in a radio section, a radio communication scheme called 5G has been studied. In 5G, various element techniques have been studied in order to satisfy requirements that latency of a radio section be less than or equal to 1 ms while achieving throughput of greater than or equal to 10 Gbps.

In 5G, a higher frequency band than that of LTE is assumed to be used. Here, since a propagation loss increases in a high frequency band, the application of massive Multi Input Multi Output (MIMO) in which beam forming with a narrow beam width is performed has been studied to compensate for it. Massive MIMO is a large-scale MIMO in which a plurality of antenna elements (for example, 100 elements) are installed at a base station side, and it is possible to reduce interference between users since it is possible to concentrate an electric field strength in a narrow region.

FIG. 1A illustrates an example of beam forming performed by a base station according to a related art such as LTE, and FIG. 1B illustrates an example of beam forming performed by a base station using massive MIMO. As illustrated in FIG. 1B, it is possible to transmit radio signals far away through beam forming with a narrow beam width. In massive MIMO, high speed communication can be achieved by performing spatial multiplexing while highly controlling a plurality of beams between a base station and a mobile station. FIG. 2 illustrates an example where two beams are spatially multiplexed while performing beam forming in both a base station and a mobile station.

PRIOR ART DOCUMENT

Non-Patent Document

Non-Patent Document 1: NTT DoCoMo, Inc. "Docomo 5G White Paper," September 2014

Non-Patent Document 2: NTT DOCOMO, NTT DOCOMO Technical Journal "5G Multi antenna technique," January 2016

SUMMARY OF THE INVENTION

Problem to be Solved by the Invention

A radio of a typical massive MIMO base station includes digital analog converters (DACs) and up-converters that are equal in number to transmitting antenna elements, and performs inverse fast Fourier transform (IFFT) and guard interval insertion in baseband signal processing the number of times corresponding to the number of transmitting antenna elements. Such a massive MIMO base station is also referred to as a "full digital type massive MIMO base station."

The full digital type massive MIMO base station is expensive because the number of radio circuits is large. In this regard, a hybrid type massive MIMO base station has been studied, in which only a beam forming (BF) process is implemented by a variable phase shifter in a radio frequency (RF) circuit, and a radio circuit is configured so that the BF process is common to all subcarriers. In the hybrid type massive MIMO base station, since the BF processing is performed through an analog circuit, it suffices if the number of DACs to be prepared and the number of up-converters to be prepared are equal to the number of the beams to be simultaneously transmitted, and it suffices to perform the IFFT and the guard interval insertion in the baseband signal processing by the digital circuit the number of times corresponding to the number of the beams. Consequently, in the hybrid type massive MIMO base station, the cost can be reduced to be smaller than that of the full digital type massive MIMO base station. FIG. 3 illustrates an example of circuit configurations of a base station and a mobile station for implementing a hybrid type BF. An exemplary circuit configuration of FIG. 3 (left side) illustrates an exemplary circuit configuration of a hybrid type massive MIMO base station. An exemplary circuit configuration of FIG. 3 (right side) illustrates an example of a circuit configuration of a mobile station when a circuit configuration similar to the hybrid type massive MIMO base station is applied to a reception side.

When spatial multiplexing (MIMO) by a plurality of beams is performed using the hybrid type massive MIMO base station, the massive MIMO base station causes the mobile station to feed back channel information (channel state information (CSI)) in a plurality of beams by transmitting a reference signal toward a plurality of beams in a direction optimal for the mobile station through analog BF, calculates an appropriate pre-coding matrix using the fed-back channel information, and performs a digital pre-coding process. In other words, in the hybrid type massive MIMO base station, it is necessary to initially search for a direction in which the beams are to be directed by the analog BF.

As a method of searching for the direction in which the beams are to be directed by the analog BF, for example, a method is considered in which the base station discretely transmits the beams at angles having predetermined intervals therebetween in a horizontal direction and a vertical direction, and the mobile station gives feedback indicating a direction in which reception power of the beams is highest. In this case, in order to improve the search accuracy, it is necessary to more finely discretize the angles in the horizontal direction and the angles in the vertical direction, but if the number of discretization steps is large, a problem is that the number of beams to be transmitted from the base station is enormous. For example, when a plurality of beams is transmitted at intervals of 10 degrees in the horizontal direction and the vertical direction as illustrated in FIG. 4A, there are 324 candidates as a beam transmission direction candidate. As illustrated in FIG. 4B, when a plurality of beams are transmitted at intervals of 5 degrees in the horizontal direction and the vertical direction, there are 1296 candidates which are four times as large as that of FIG. 4A as a beam transmission direction candidate.

In order to cause the mobile station to feed back a direction in which the beam reception power is highest, it is necessary to transmit an orthogonalized signal for each beam in all the beam transmission direction candidates, and thus a large amount of radio resources are consumed. Further, in order to improve the search accuracy, since the number of beam transmission direction candidates is large, a larger amount of radio resources are consumed.

The disclosed technology of the disclosure has been developed in light of the foregoing, and an object is to provide a technique that allows a beam transmission direction to be efficiently searched for in a radio communication system in which massive MIMO is supported.

Means for Solving Problem

A base station according to the disclosed technology is a base station of a radio communication system including the base station and a mobile station that performs communication with the base station, the base station including a first discovery signal transmitter that transmits a plurality of first discovery signals in respective different transmission directions from the base station through beam forming; and a second discovery signal transmitter that transmits, for each of one or more first transmission directions of the plurality of transmission directions corresponding to one or more first discovery signals of the plurality of first discovery signals reported from the mobile station, second discovery signals in a respective plurality of second transmission directions, the plurality of second transmission directions being within a predetermined range from the first transmission direction, wherein, when each second discovery signal of the plurality of second discovery signals is to be transmitted, the second discovery signal transmitter transmits the second discovery signal by multiplying, by a correction precoding vector, the second discovery signal to be transmitted, the correction precoding vector being for adding, to the first transmission direction, a difference in transmission angles between the first transmission direction that is within the predetermined range from the second discovery signal and a second transmission direction of the second discovery signal to be transmitted, and by performing beam forming for the second discovery signal, the correction precoding vector being multiplied to the second discovery signal, using a first weight matrix for performing beam forming in the first transmission direction that is within the predetermined range from the second discovery signal.

Advantage of the Invention

According to the disclosed technology, a technique is provided which allows a transmission direction of a beam to be efficiently searched for in a radio communication system supporting Massive MIMO.

BRIEF DESCRIPTION OF DRAWINGS

FIG. 14 is a diagram for illustrating a signal processing method when an update discovery signal and user data are frequency-multiplexed and transmitted.

EMBODIMENTS OF THE INVENTION

Hereinafter, an exemplary embodiment of the present invention is described with reference to the appended drawings. An embodiment to be described below is merely an example, and an embodiment to which the present invention is applied is not limited to the following embodiment. For example, a radio communication system according to the present embodiment is assumed to be a system of a scheme conforming to LTE or 5G, but the present invention is not limited to LTE or 5G but can be applied to other schemes.

<System Configuration>

Figure 5:
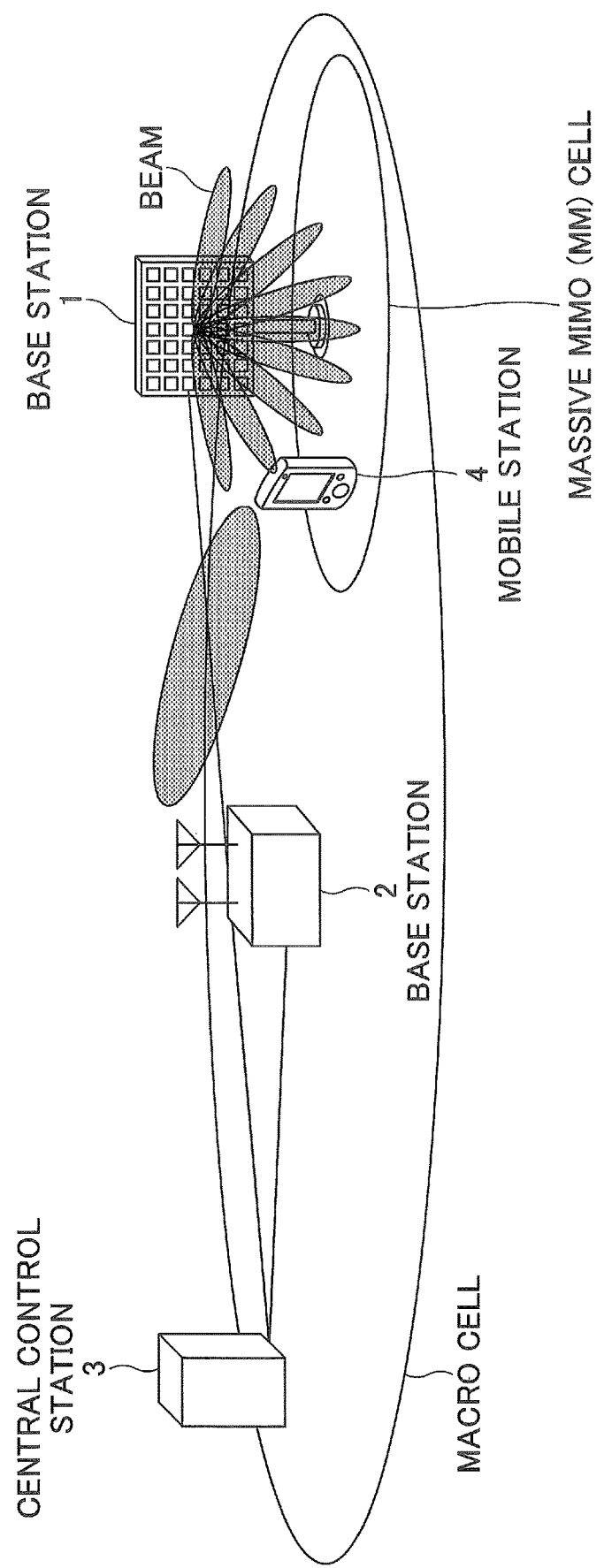
FIG. 5 is a diagram illustrating an exemplary configuration of a radio communication system according to an embodiment.

FIG. 5 is a diagram illustrating an exemplary configuration of a radio communication system according to an embodiment. The radio communication system according to the embodiment includes a base station 1 supporting the hybrid type massive MIMO, a base station 2 forming a macro cell, a central control station 3, and a mobile station 4. The base station 1 includes a plurality of antenna elements and forms a massive MIMO cell (an MM cell). The MM cell indicates a cell formed by a plurality of beams transmitted from the base station 1. In the MM cell, for example, it is possible to realize higher speed communication than in a macro cell, for example, using a band having a bandwidth of 100 MHz or higher at 5G Hz or higher.

The base station 2 forms a macro cell with a larger coverage than the MM cell. The macro cell is assumed to be a cell of LTE (including LTE-advanced (LTE-A)), but the macro cell is not limited thereto and may be a cell using a radio technique other than LTE such as a wireless LAN. In other words, in the present embodiment, cells of LTE or, cells of the wireless LAN, or the like are arranged to overlap the MM cell.

The central control station 3 has a function of concentratedly controlling the base station 1 and the base station 2. For example, the central control station 3 performs scheduling of radio resources possessed by the base station 1 and base station 2, control of a higher layer (for example, a RRC layer or the like), and the like.

The mobile station 4 has a function of communicating with the base station 1 or the base station 2. One mobile station 4 is illustrated in FIG. 5, but two or more mobile stations 4 may be provided in the present embodiment. The mobile station 4 may have a function of communicating with either of the base station 1 and the base station 2 or may have a function (multiple connectivity) of simultaneously performing communication with the base station 1 and the base station 2.

<Operation Overview>

Figure 6A:
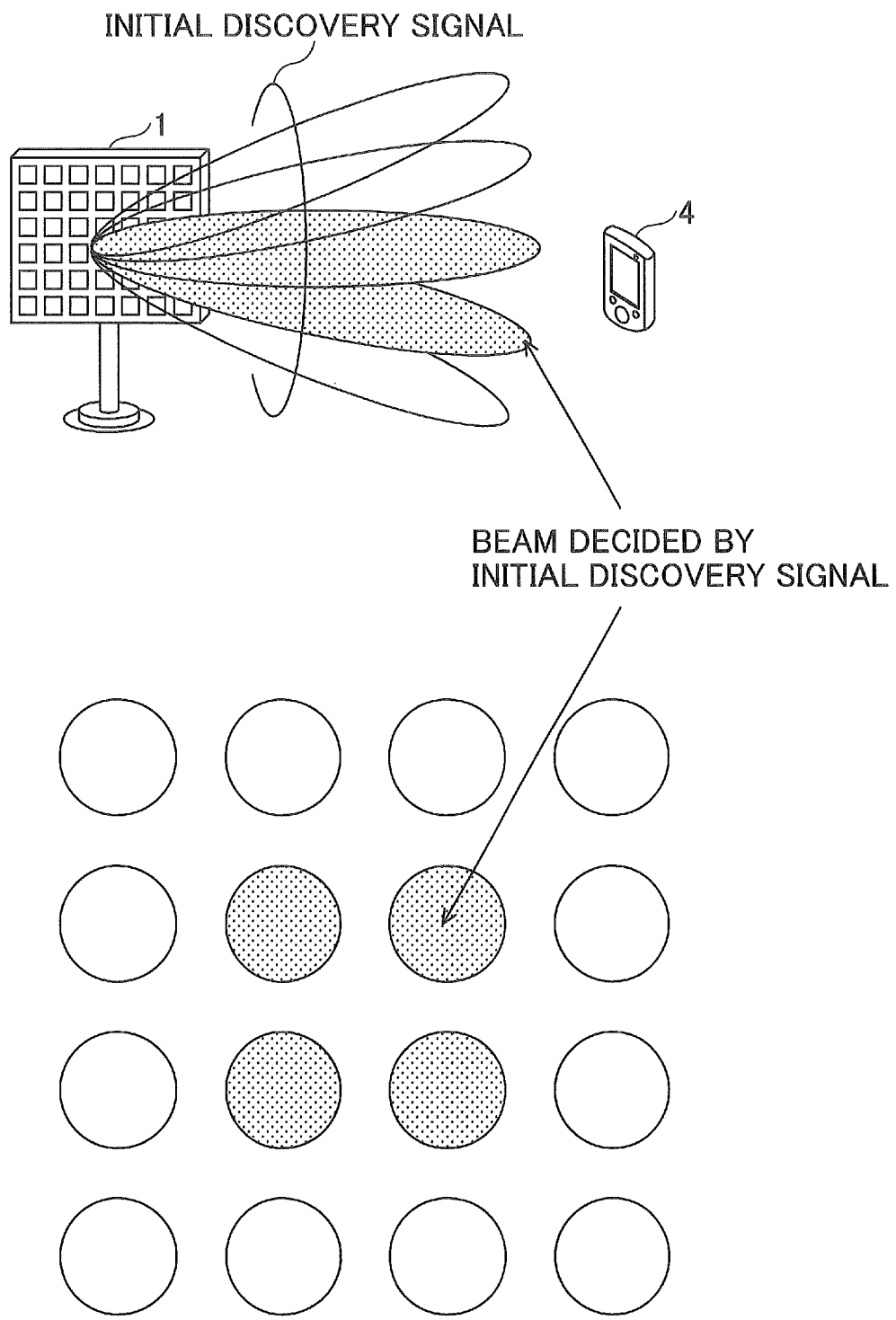
FIG. 6A is a diagram for illustrating an operation overview of a radio communication system according to an embodiment.

The base station 1 according to the present embodiment transmits an orthogonalized discovery signal (hereinafter, referred to as an "initial discovery signal") in a horizontal direction and a vertical direction with respect to an antenna plane at rough intervals (for example, at an interval of) 10°, causes the mobile station 4 to feed back a direction in which the initial discovery signal of high reception power is transmitted by the beam, and decides a rough beam transmission direction by the analog BF. FIG. 6A illustrates an image of a direction in which the initial discovery signal is transmitted and a decided beam transmission direction. An upper diagram of FIG. 6A illustrates an image of a direction in which the initial discovery signal is transmitted and a decided beam transmission direction when a space is divided by a vertical plane, and a lower diagram of FIG. 6A illustrates an image of an arrival direction of the initial discovery signal and a decided beam arrival direction when viewed from the front of the base station 1.

Figure 6B:
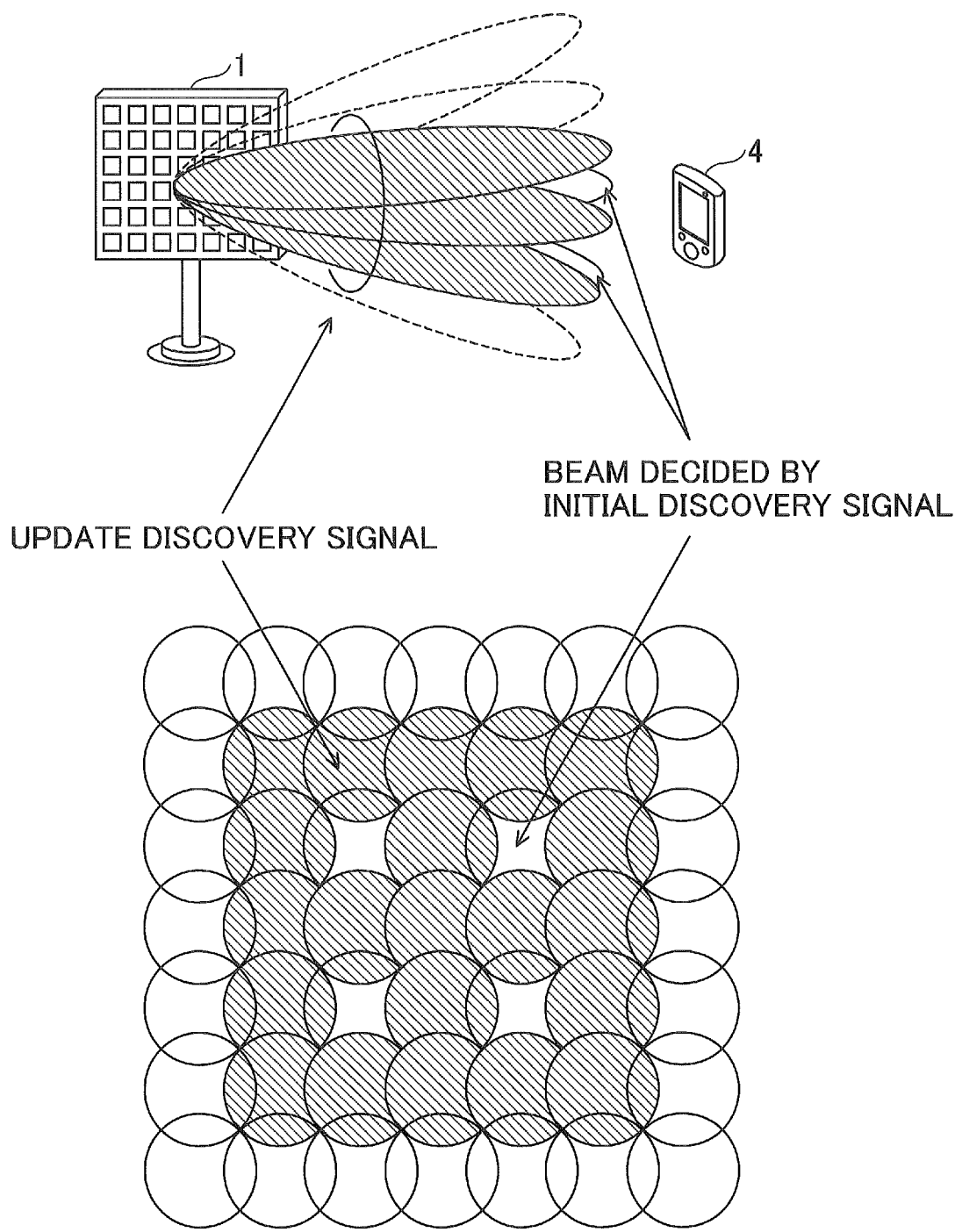
FIG. 6B is a diagram for illustrating the operation overview of the radio communication system according to the embodiment.

Then, the base station 1 transmits an orthogonalized discovery signal (hereinafter, referred to as an "update discovery signal") at smaller intervals than those of the initial discovery signal (for example, intervals of 5°) in the horizontal direction and the vertical direction with respect to a direction around the rough beam transmission direction, causes the mobile station to feed back a direction in which the update discovery signal of high reception power is transmitted by the beam, and decides a beam transmission direction by the analog BF in further detail. An upper diagram of FIG. 6B illustrates an image of the direction in which the update discovery signal is transmitted when the space is divided by the vertical plane, and a lower diagram of FIG. 6B illustrates an image of an arrival direction of the update discovery signal when viewed from the front of the base station 1. In the present radio communication system, it is possible to efficiently search for the beam transmission direction by deciding the beam transmission direction by the analog BF through the two-step processing procedure using the initial discovery signal and the update discovery signal.

Further, the base station 1 transmits the reference signal in transmission directions of a plurality of beams decided by the initial discovery signal, causes the mobile station 4 to feed back channel information of the plurality of beams, and calculates a pre-coding matrix using the fed-back channel information. Then, the base station 1 performs frequency multiplexing on the update discovery signal and a user data signal generated using the calculated pre-coding matrix, and transmits a resulting signal. Specifically, referring to FIG. 6, the base station 1 transmits the user data by spatial multiplexing streams using a plurality of beams decided by the initial discovery signal (beams in directions illustrated in FIG. 6A), and transmits the update discovery signal through a plurality of beams illustrated in FIG. 6B. Thus, in the present radio communication system, it is possible to efficiently use the radio resources.

<Functional Configuration>

(Base Station)

Figure 7A:
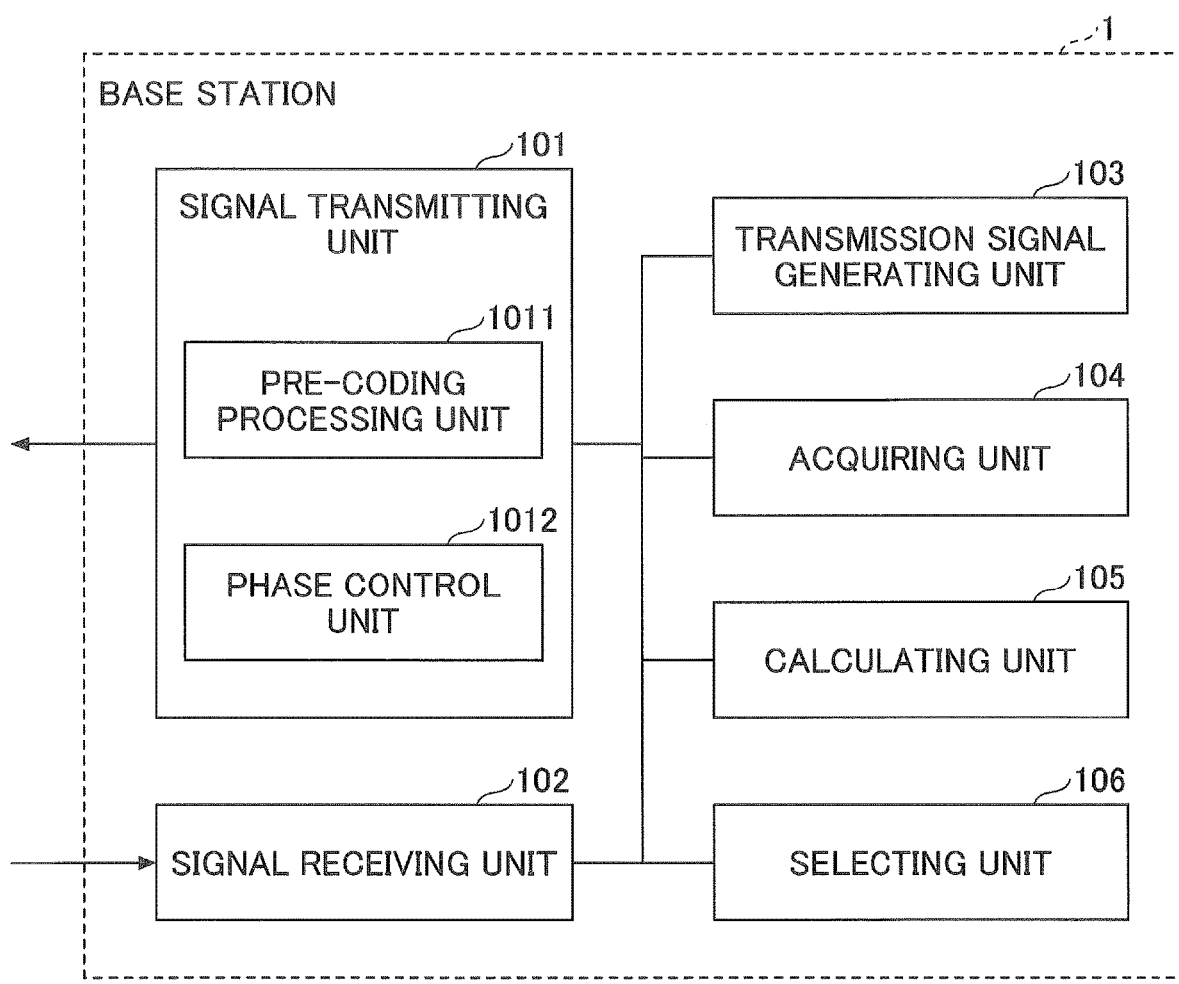
FIG. 7A is a diagram illustrating an exemplary functional configuration of a base station according to an embodiment.

FIG. 7 is a diagram illustrating an exemplary functional configuration of the base station according to an embodiment. As illustrated in FIG. 7A, the base station 1 includes a signal transmitting unit 101, a signal receiving unit 102, a transmission signal generating unit 103, an acquiring unit 104, a calculating unit 105, and a selecting unit 106. FIG. 7A illustrates only main function units in the present embodiment, and functions (not illustrated) of performing operations conforming to a communication scheme used in the present radio communication system are also provided.

The signal transmitting unit 101 has a function of wirelessly transmitting signals generated by the transmission signal generating unit 103. The signal transmitting unit 101 further includes a pre-coding processing unit 1011 and a phase control unit 1012. The pre-coding processing unit 1011 performs a pre-coding process of suppressing interference among a plurality of streams to be transmitted toward the mobile station 4. The phase control unit 1012 is a functional unit that changes a phase by the analog BF and has a function of controlling a phase by which each antenna element is multiplied when a plurality of beams are transmitted toward the mobile station 4.

Figure 7B:
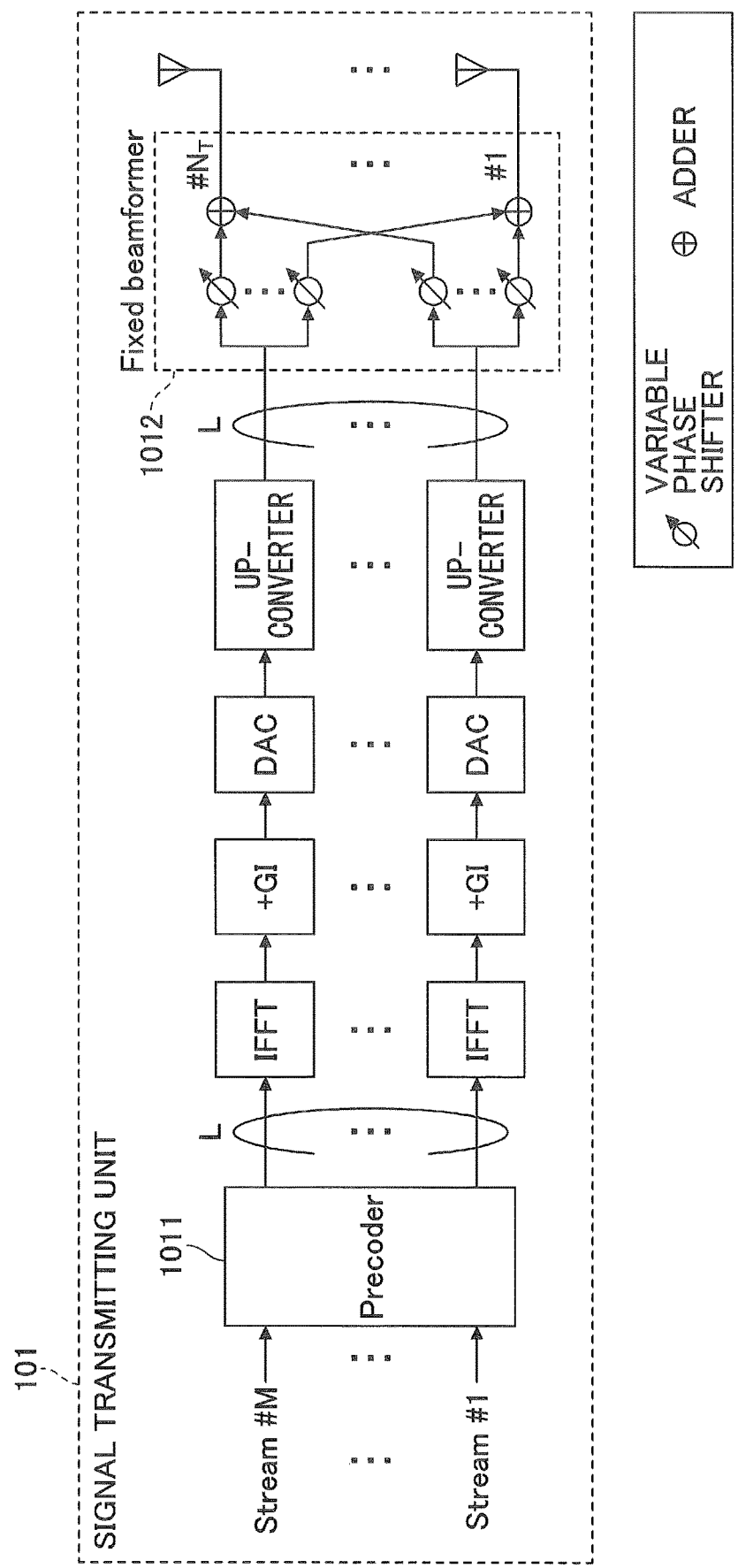
FIG. 7B is a diagram illustrating an exemplary functional configuration of a signal transmitter of the base station according to the embodiment.

FIG. 7B illustrates a specific exemplary functional configuration of the signal transmitting unit 101. As illustrated in FIG. 7B, the signal transmitting unit 101 includes a precoder that performs a pre-coding process on M streams (signals in a frequency domain) to be transmitted to the mobile station 4, an "IFFT" that transforms the signals I the frequency domain by perform inverse Fourier transform on the signals in the frequency domain corresponding to the number (L) of a plurality of beams to be transmitted, a "+GI" that inserts a guard interval (for example, a cyclic prefix), a "DAC" that performs DA conversion, an "up-converter" that performs up-conversion, and a fixed beamformer including a phase shifter that controls a phase by which each of "$N_T$" antenna elements is multiplied for every two or more beams. The pre-coding processing unit 1011 and the phase control unit 1012 of FIG. 7A correspond to the precoder and the fixed beamformer of FIG. 7B, respectively.

The signal receiving unit 102 has a function of receiving a physical layer signal from the mobile station 4 and acquiring a signal of a higher layer from the received signal.

The transmission signal generating unit 103 has a function of generating a signal of the physical layer to be transmitted toward the mobile station 4 from the signal of the higher layer and transferring the signal to the signal transmitting unit 101. For example, the transmission signal generating unit 103 has a function of generating the initial discovery signal, the update discovery signal, the reference signal, and the user data to be transmitted toward the mobile station 4. The transmission signal generating unit 103 may be included in the signal transmitting unit 101.

The acquiring unit 104 has a function of acquiring various kinds of information reported from the mobile station 4. More specifically, the acquiring unit 104 has a function of acquiring various kinds of information indicating the transmission directions of the initial discovery signal and the update discovery signal which are determined to have high reception power by the mobile station 4, the channel information estimated by the mobile station 4 (the channel estimation value, the channel matrix, and the like), and the like.

The calculating unit 105 has a function of performing various kinds of calculation processes such as a calculation of the pre-coding matrix used in the pre-coding processing unit 1011 and a calculation of a weight by which each antenna element is multiplied by the phase control unit 1012. The calculating unit 105 may be included in the signal transmitting unit 101.

The selecting unit 106 has a function of selecting a beam to be actually transmitted (an initial beam and an updated beam) from beam candidates (initial beam candidates and updated beam candidates). The initial beam candidate, the initial beam, the updated beam candidate, and the updated beam are described below. The selecting unit 106 may be included in the signal transmitting unit 101.

(Mobile Station)

Figure 8:
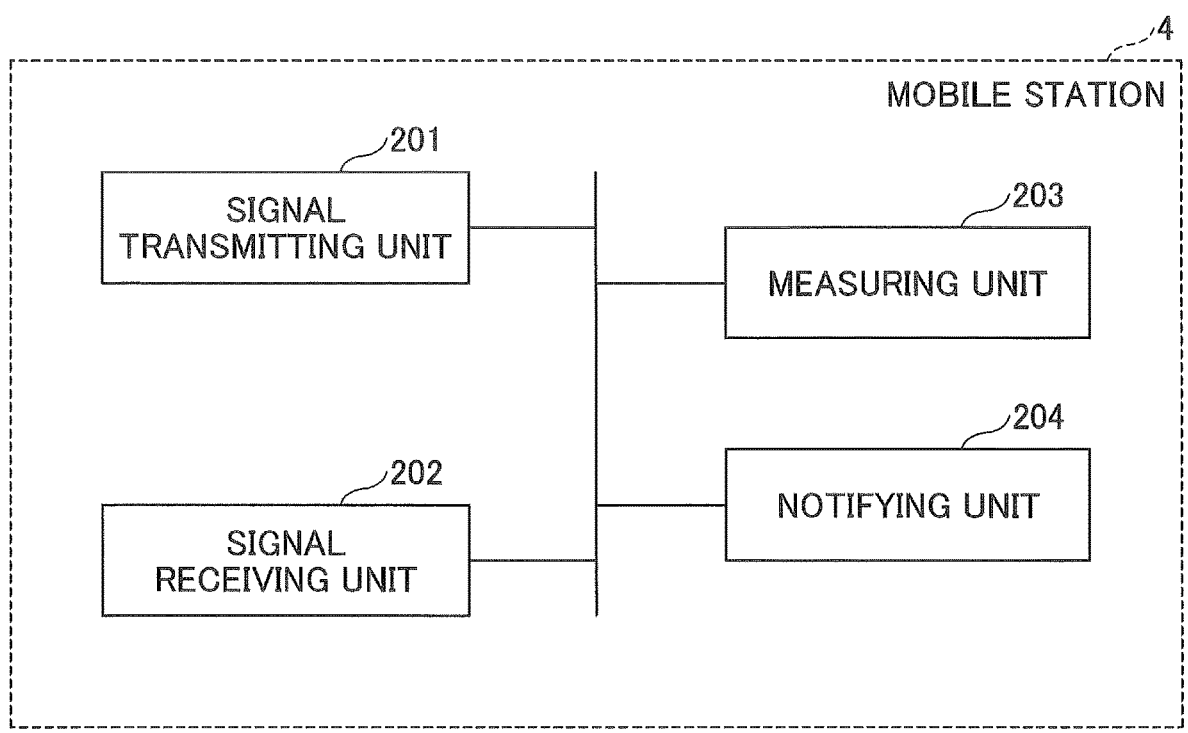
FIG. 8 is a diagram illustrating an exemplary functional configuration of a mobile station according to an embodiment.

FIG. 8 is a diagram illustrating an exemplary functional configuration of the mobile station according to an embodiment. As illustrated in FIG. 8, the mobile station 4 includes a signal transmitting unit 201, a signal receiving unit 202, a measuring unit 203, and a notifying unit 204. FIG. 8 illustrates only main function units in the present embodiment, and functions (not illustrated) of performing operations conforming to a communication scheme used in the present radio communication system are also provided.

The signal transmitting unit 201 includes a function of generating various kinds of signals of the physical layer from signals of the higher layer to be transmitted from the mobile station 4 and wirelessly transmitting the signals. The signal receiving unit 202 has a function of wirelessly receiving various signals from the base station 1 and acquiring a signal of the higher layer from the received signal of the physical layer.

The measuring unit 203 has a function of measuring the reception power of each of one or more initial discovery signals and one or more update discovery signals received through the signal receiving unit 202. The measuring unit 203 has a function of detecting the transmission directions of one or more initial discovery signals and one or more update discovery signals received by signal receiving unit 202 (the transmission directions from the base station 1). The measuring unit 203 performs channel estimation using the reference signal transmitted from the base station 1.

The notifying unit 204 has a function of giving a notification (feedback) of various kinds of information measured by the measuring unit 203 to the base station 1. More specifically, the notifying unit 204 has a function of notifying the base station 1 of the transmission direction and the reception power of each of one or more initial discovery signals and one or more update discovery signals measured by the measuring unit 203. Further, the notifying unit 204 notifies the base station 1 of the channel information estimated by the measuring unit 203 (the channel estimation value, the channel matrix, and the like).

The entire functional configurations of the base station 1 and the mobile station 4 described above may be implemented by a hardware circuit (for example, one or a plurality of IC chips), or a part of the functional configurations may be formed of a hardware circuit, and the remaining parts may be implemented by a CPU and a program.

(Base Station)

Figure 9:
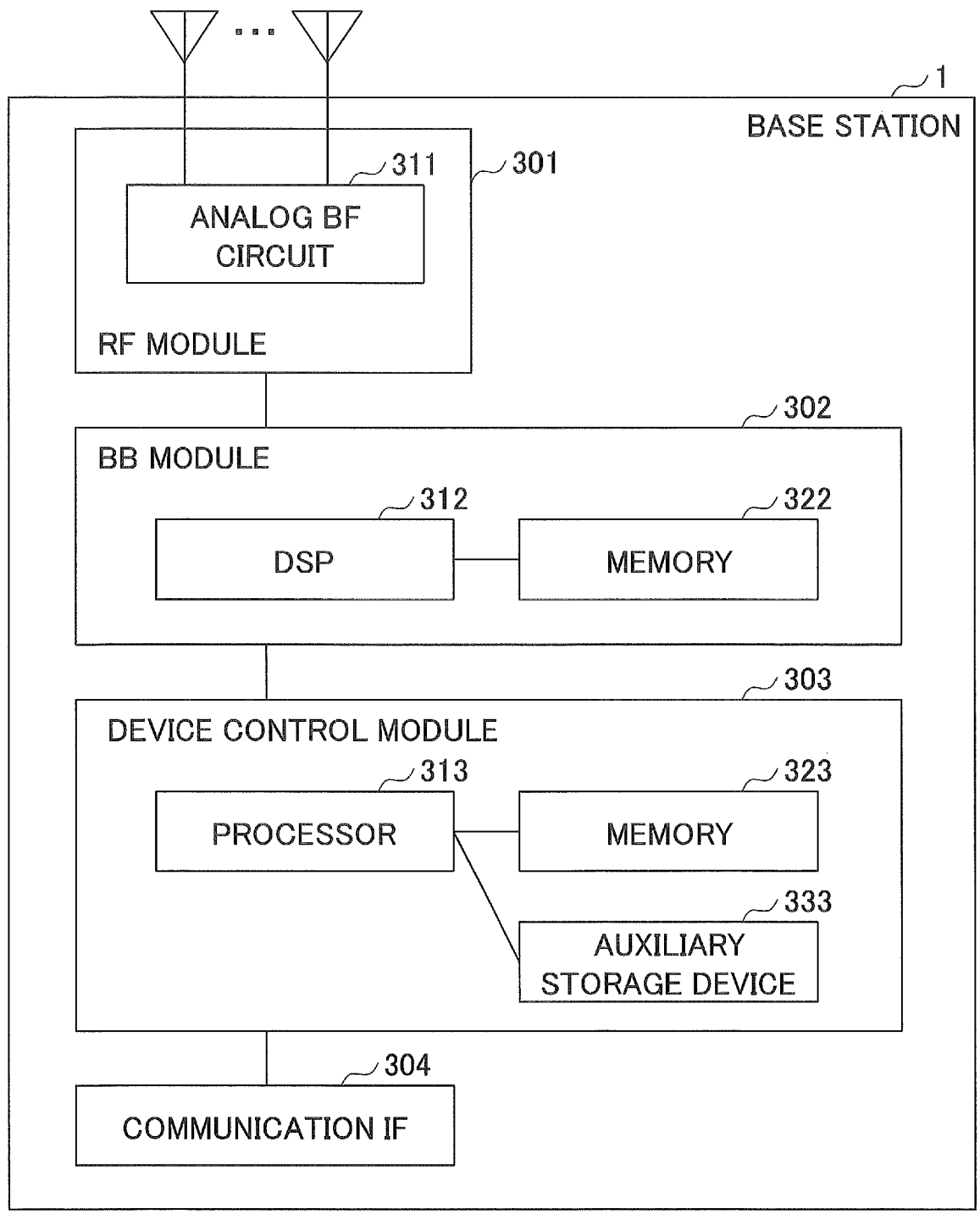
FIG. 9 is a diagram illustrating an example of a hardware configuration of a base station according to an embodiment.

FIG. 9 is a diagram illustrating an example of a hardware configuration of the base station according to an embodiment. FIG. 9 illustrates a configuration that is closer to an implementation example than that of FIG. 7. As illustrated in FIG. 9, the base station 1 includes a radio frequency (RF) module 301 that performs processing related to a radio signal, a baseband (BB) processing module 302 that performs baseband signal processing, a device control module 303 that performs processing of the higher layer and the like, and a communication IF 304 which is an interface for a connection with a network.

The RF module 301 performs digital-to-analog (D/A) conversion, modulation, frequency transform, power amplification, and the like on a digital baseband signal received from the BB processing module 302 and generates a radio signal to be transmitted through an antenna. Further, the RF module 301 performs frequency transform, analog to digital (A/D) conversion, demodulation, and the like on a received radio signal, generates a digital baseband signal, and transfers the digital baseband signal to the BB processing module 302. An analog BF circuit 311 includes a phase shifter and an adder. The RF module 301 includes, for example, a part of the signal transmitting unit 101 and a part of the signal receiving unit 102 illustrated in FIG. 7.

The BB processing module 302 performs a process of converting an IP packet into a digital baseband signal and vice versa. A digital signal processor (DSP) 312 is a processor that performs signal processing in the BB processing module 302. A memory 322 is used as a work area of the DSP 312. For example, the BB processing module 302 includes a part of the signal transmitting unit 101, a part of the signal receiving unit 102, the transmission signal generating unit 103, the acquiring unit 104, the calculating unit 105, and the selecting unit 106 illustrated in FIG. 7.

The device control module 303 performs protocol processing of the IP layer, an operation and maintenance (OAM) process, and the like. A processor 313 is a processor that performs processing performed by the device control module 303. A memory 323 is used as a work area of the processor 313. An auxiliary storage device 333 is, for example, an HDD or the like, and stores various kinds of configuration information and the like for an operation of the base station 1. The device control module 303 may include, for example, the acquiring unit 104, the calculating unit 105, and the selecting unit 106 illustrated in FIG. 7.

(Mobile Station)

Figure 10:
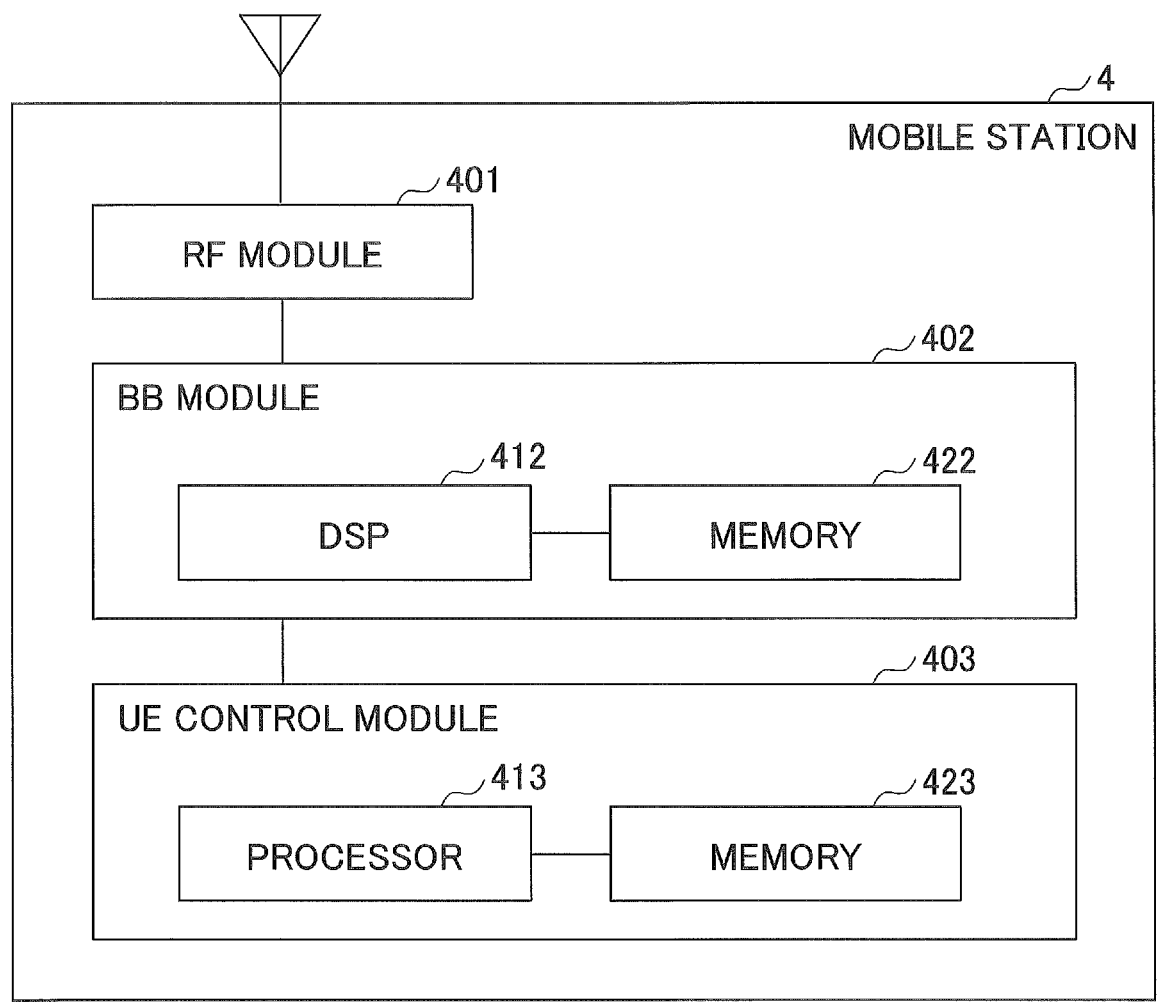
FIG. 10 is a diagram illustrating an example of a hardware configuration of a mobile station according to the embodiment.

FIG. 10 is a diagram illustrating an example of a hardware configuration of the mobile station according to an embodiment. FIG. 10 illustrates a configuration that is closer to the implementation example than that of FIG. 8. As illustrated in FIG. 10, the mobile station 4 includes an RF module 401 that performs processing relating to radio signals, a BB processing module 402 that performs baseband signal processing, and a UE control module 403 that performs processing of the higher layer and the like.

The RF module 401 performs D/A conversion, modulation, frequency transform, power amplification, and the like on a digital baseband signal received from the BB processing module 402 and generates a radio signal to be transmitted through an antenna. Further, the RF module 401 performs frequency transform, A/D conversion, demodulation, and the like on a received radio signal, generates a digital baseband signal, and transfers the digital baseband signal to the BB processing module 402. The RF module 401 includes, for example, a part of the signal transmitting unit 201 and a part of the signal receiving unit 202 illustrated in FIG. 8.

The BB processing module 402 performs a process of converting an IP packet into a digital baseband signal and vice versa. A DSP 412 is a processor that performs signal processing in the BB processing module 402. A memory 422 is used as a work area of the DSP 412. The BB processing module 402 includes, for example, a part of the signal transmitting unit 201, a part of the signal receiving unit 202, the measuring unit 203, and the notifying unit 204 illustrated in FIG. 8.

The UE control module 403 performs protocol processing of the IP layer, processing of various applications, and the like. A processor 413 is a processor that performs the processing performed by the UE control module 403. A memory 423 is used as a work area of the processor 413. The UE control module 403 may include, for example, the notifying unit 204 illustrated in FIG. 8.

<Processing Procedure>

Figure 11:
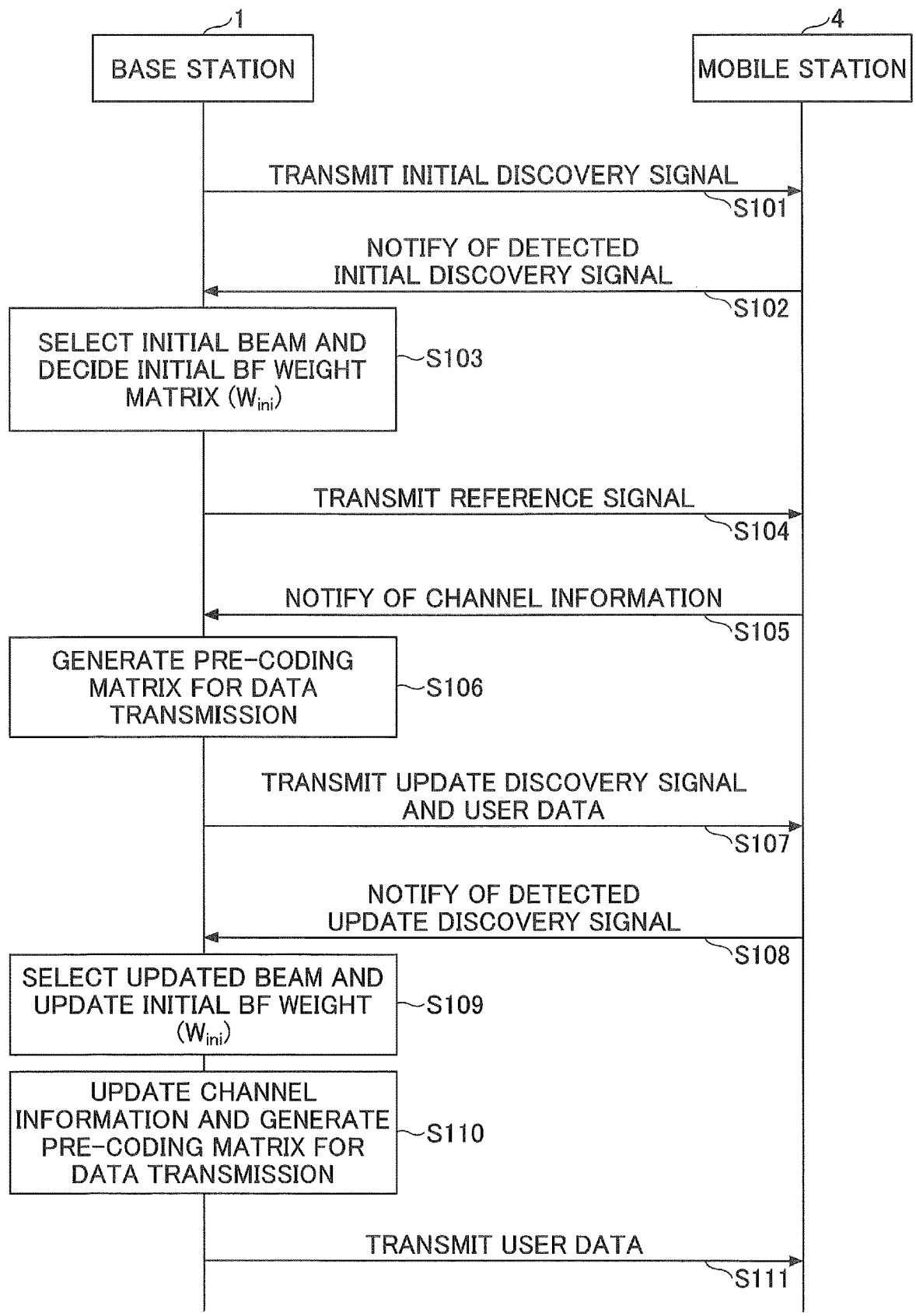
FIG. 11 is a sequence diagram illustrating an example of a processing procedure performed in a radio communication system according to an embodiment.

FIG. 11 is a sequence diagram illustrating an example of a processing procedure performed in the radio communication system according to the embodiment. A series of processing procedures from transmission of the initial discovery signal to transmission of the user data is specifically described with reference to FIG. 11.

Figure 12:
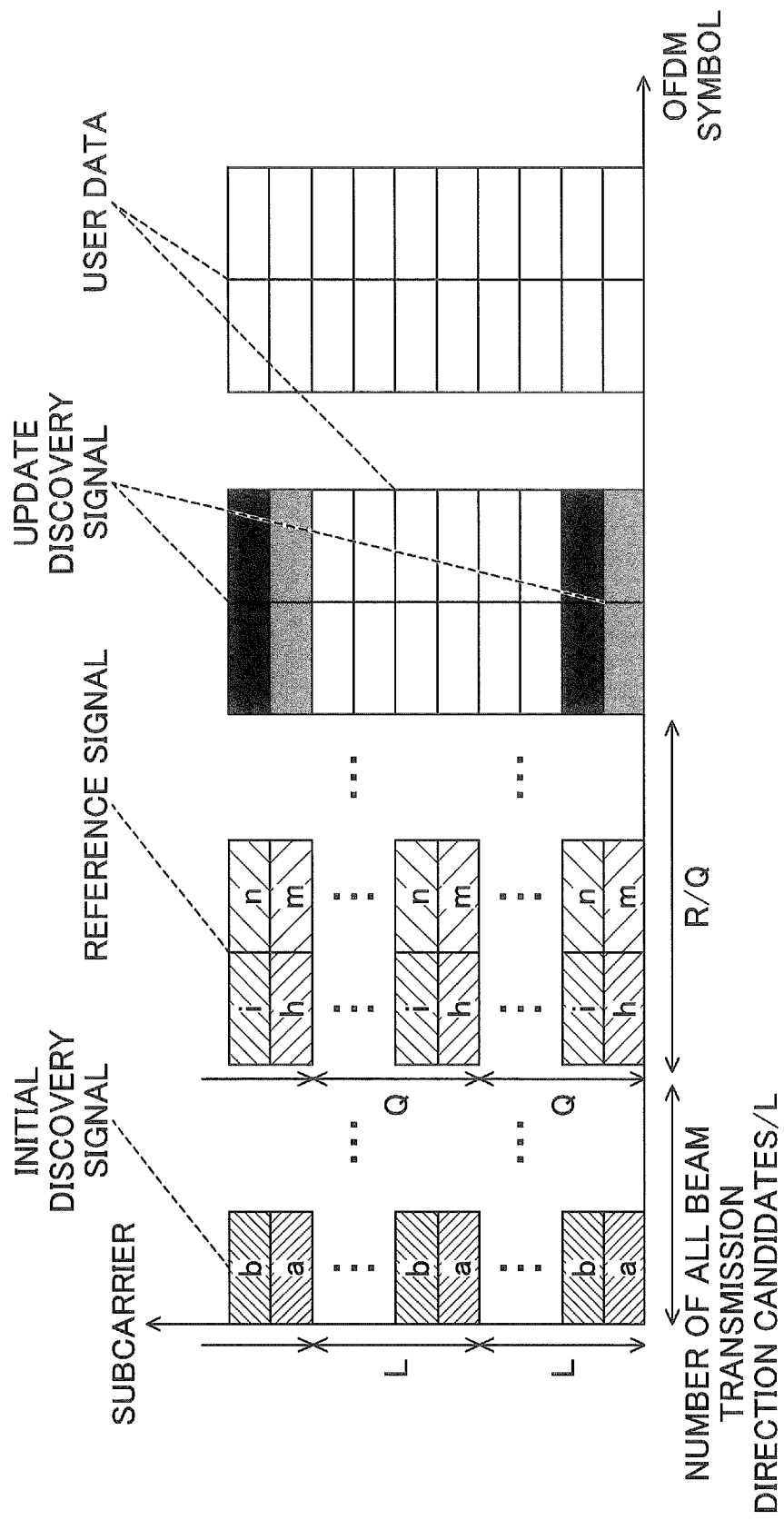
FIG. 12 is a diagram for illustrating a specific arrangement example of various types of signals.

In step S101, the signal transmitting unit 101 of the base station 1 transmits orthogonalized initial discovery signals through beams at predetermined intervals (for example, at intervals of 10 degrees) in the horizontal direction and the vertical direction. Here, an arrangement example of the initial discovery signals is specifically described with reference to FIG. 12. In FIG. 12, "L" indicates the number of initial discovery signals which are transmitted simultaneously at a certain timing. A horizontal axis of FIG. 12 is one OFDM symbol, but it is merely an example, and it may be any other unit (for example, a plurality of OFDM symbols or subcarriers). As illustrated in FIG. 12, a plurality of orthogonalized initial discovery signals transmitted in different transmission directions are repeatedly mapped to different subcarriers at intervals of "L." For example, in the example of FIG. 12, three resources at positions of "a" are illustrated at intervals of subcarriers "L," and it indicates that in the three resources, the initial discovery signals are transmitted through beams in the same direction. Similarly, it indicates that initial discovery signals in different transmission directions than the initial discovery signals mapped to the resources at the position of "a" are mapped to resources at positions "b."

Figure 1A:
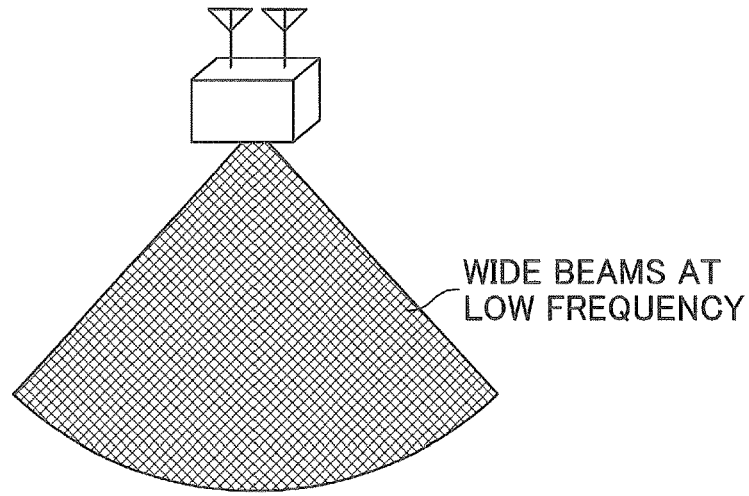
FIG. 1A is a diagram illustrating an example of beam forming.
Figure 1B:
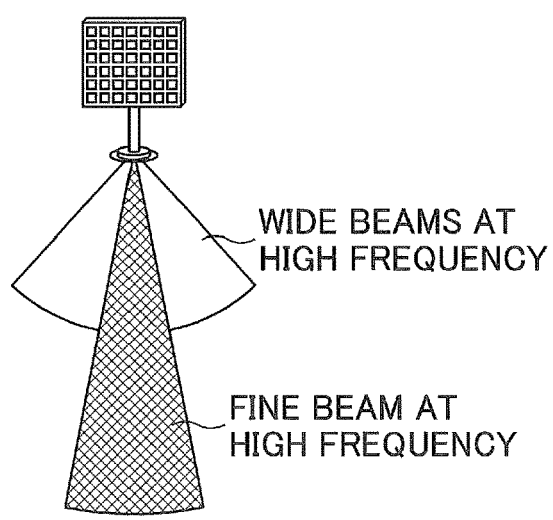
FIG. 1B is a diagram illustrating an example of beam forming performed by a base station using Massive MIMO.
Figure 2:
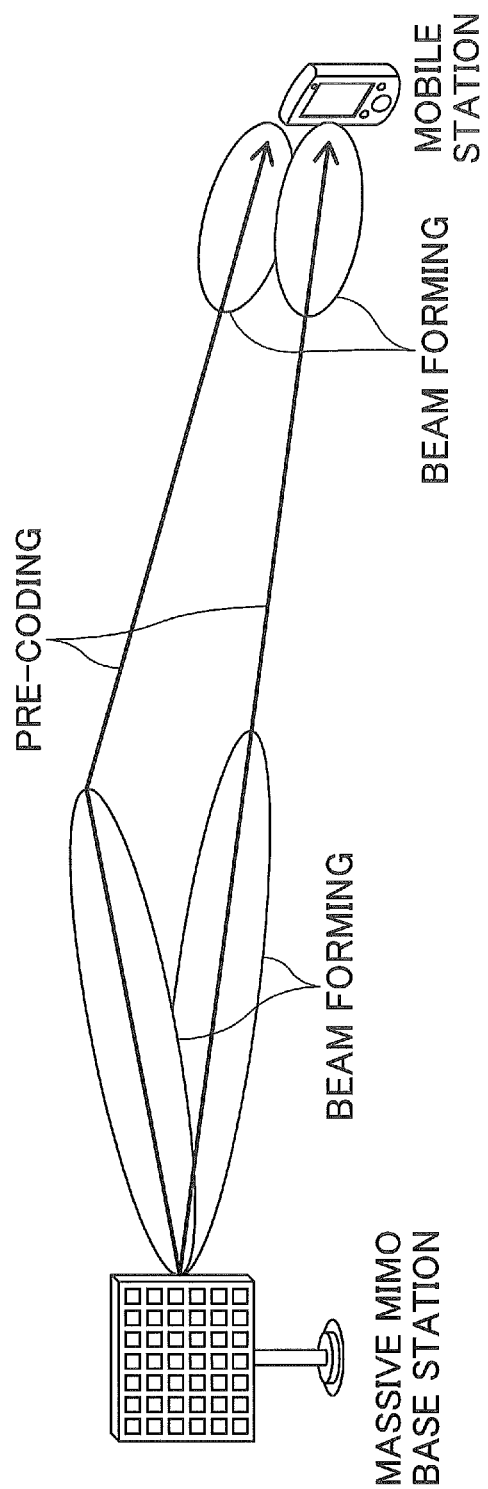
FIG. 2 is a diagram illustrating an example in which communication is performed using two beams.
Figure 3:
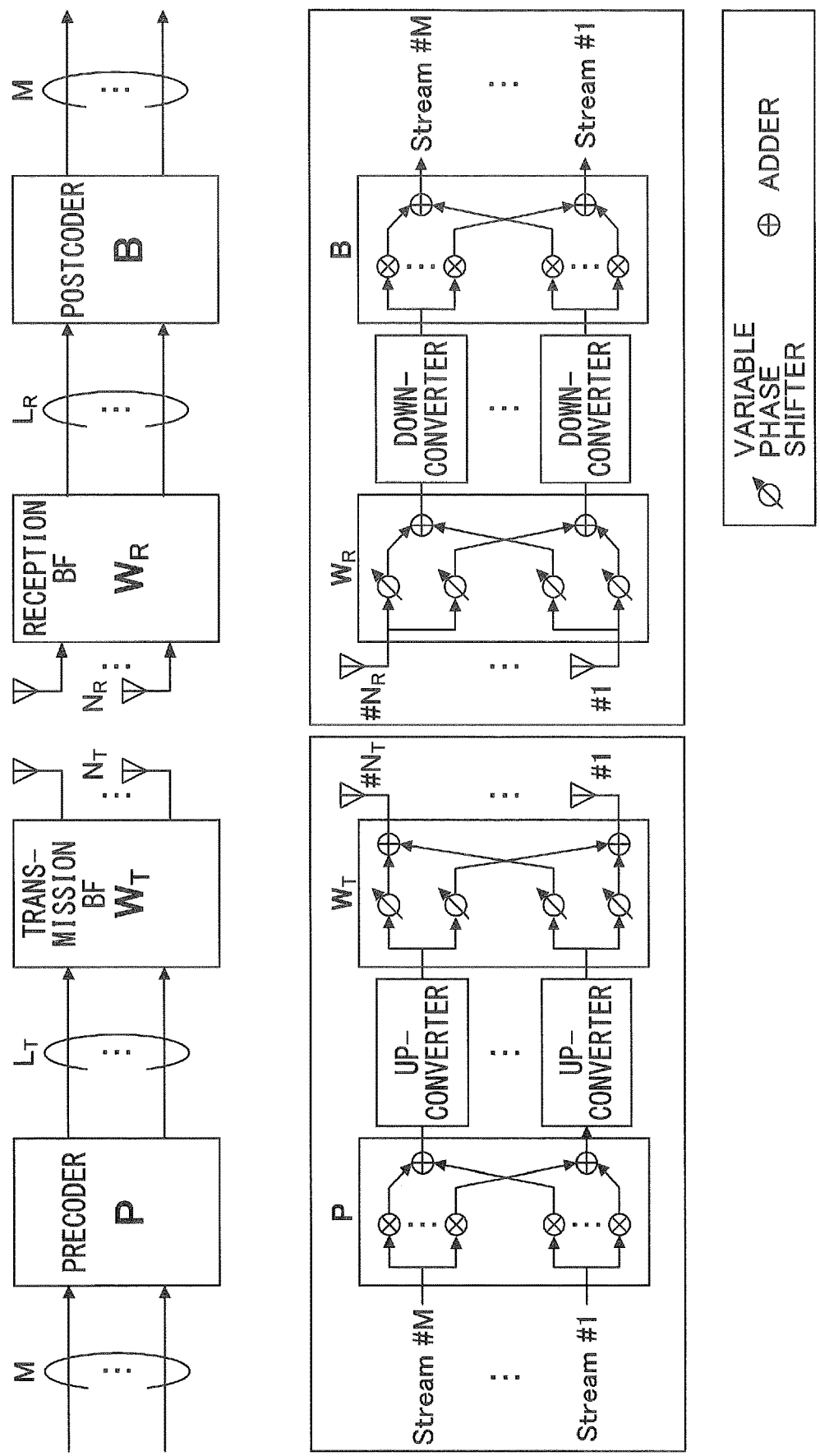
FIG. 3 is a diagram illustrating an example of circuit configurations of a base station and a mobile station for implementing a hybrid BF.
Figure 4A:
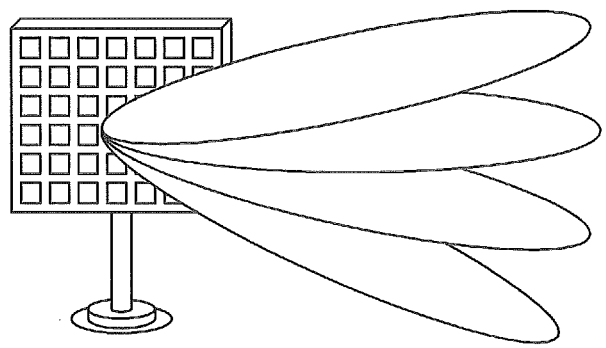
FIG. 4A is a diagram illustrating a number of beam transmission direction candidates.
Figure 4B:
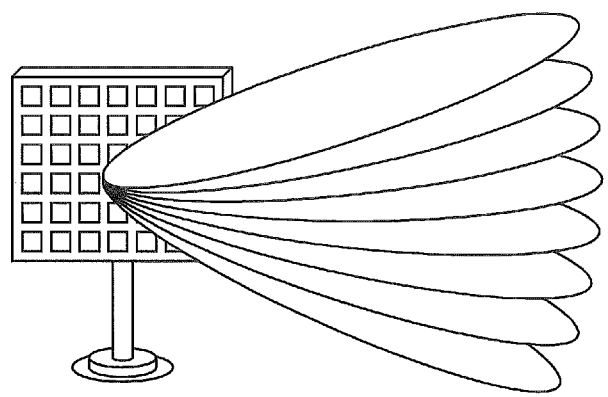
FIG. 4B is a diagram illustrating a number of beam transmission direction candidates.

In the case where "L" is smaller than to the number of all beam transmission direction candidates, time multiplexing is performed at timings of the number of all beam transmission direction candidates/"L" so that the orthogonalized initial discovery signal is transmitted in all the beam transmission directions. For example, as described above with reference to FIG. 4A, when a plurality of beams are transmitted at intervals of 10 degrees in the horizontal direction and the vertical direction, there are 324 candidates as the number of all beam transmission direction candidates. In the preset embodiment, the number of beams that can be simultaneously transmitted by the base station 1 is assumed to 36. In this case, the base station 1 transmits the initial discovery signal in all the transmission directions using nine OFDM symbols.

In the present embodiment, a subcarrier, a timing, and a direction used for beam transmission are assumed to be decided in advance between the base station 1 and the mobile station 4. For example, the base station 1 and the mobile station 4 hold a table indicating a subcarrier, a timing, and a direction used for beam transmission in common. The mobile station 4 can detect a direction in which a received initial discovery signal is transmitted by comparing a subcarrier and a timing in which the initial discovery signal is received with the table.

"L" is assumed to be equal to the number of beams that can be simultaneously transmitted by the base station 1 (that is, the number of beams that can be simultaneously transmitted in the circuit configuration illustrated in FIG. 7(b)), but "L" is not limited thereto and may be equal to or less than the number of beams that can be simultaneously transmitted. However, if "L" is equal to the number of beams that can be simultaneously transmitted, the initial discovery signal can be transmitted in all directions in a shorter time.

In step S102, the measuring unit 203 of the mobile station 4 receives one or more initial discovery signals transmitted from the base station 1, and measures the reception power of one or more received initial discovery signals (more specifically, average reception power of a plurality of subcarriers to which the same initial discovery signal is mapped). Further, the notifying unit 204 notifies the base station 1 of the reception power of the measured initial discovery signal and information indicating a direction in which the measured initial discovery signal has been transmitted in the descending order of the reception power. For example, when four initial discovery signals are received, the mobile station 4 notifies the base station 1 of information indicating the reception power and the transmission direction of each of the four initial discovery signals. The mobile station 4 may notify the base station 1 of the information indicating the reception power and the transmission method through the base station 2 of the macro cell. Hereinafter, a plurality of beams in the reception power order reported from the mobile station 4 are referred to as "initial beam candidates." The mobile station 4 may notify the base station 1 of the initial station candidates for all the initial discovery signals received by the mobile station 4 or may notify the base station of "L" initial station candidates in the reception power when the number of received initial discovery signals is larger than "L." Since the base station 1 can transmit only "L" beams at maximum, it is possible to reduce a signal amount of a control signal by causing the mobile station 4 to notify of the initial beam candidates so that the number of notified initial beam candidates does not exceed "L."

Here, the transmission direction of the initial discovery signal with the maximum reception power among the initial discovery signals received by the mobile station 4 (the transmission direction when viewed from the base station 1) can be indicated by the following Formula (1).

[Math. 1]

$$(n_\phi^{opt}, n_\theta^{opt}) = \underset{n_\phi, n_\theta}{\mathrm{argmax}} \|H(n)w(n_\phi\Delta\phi, n_\theta\Delta\theta)s_l(n) + z(n)\|^2 \quad \text{Formula (1)}$$

Figure 13:
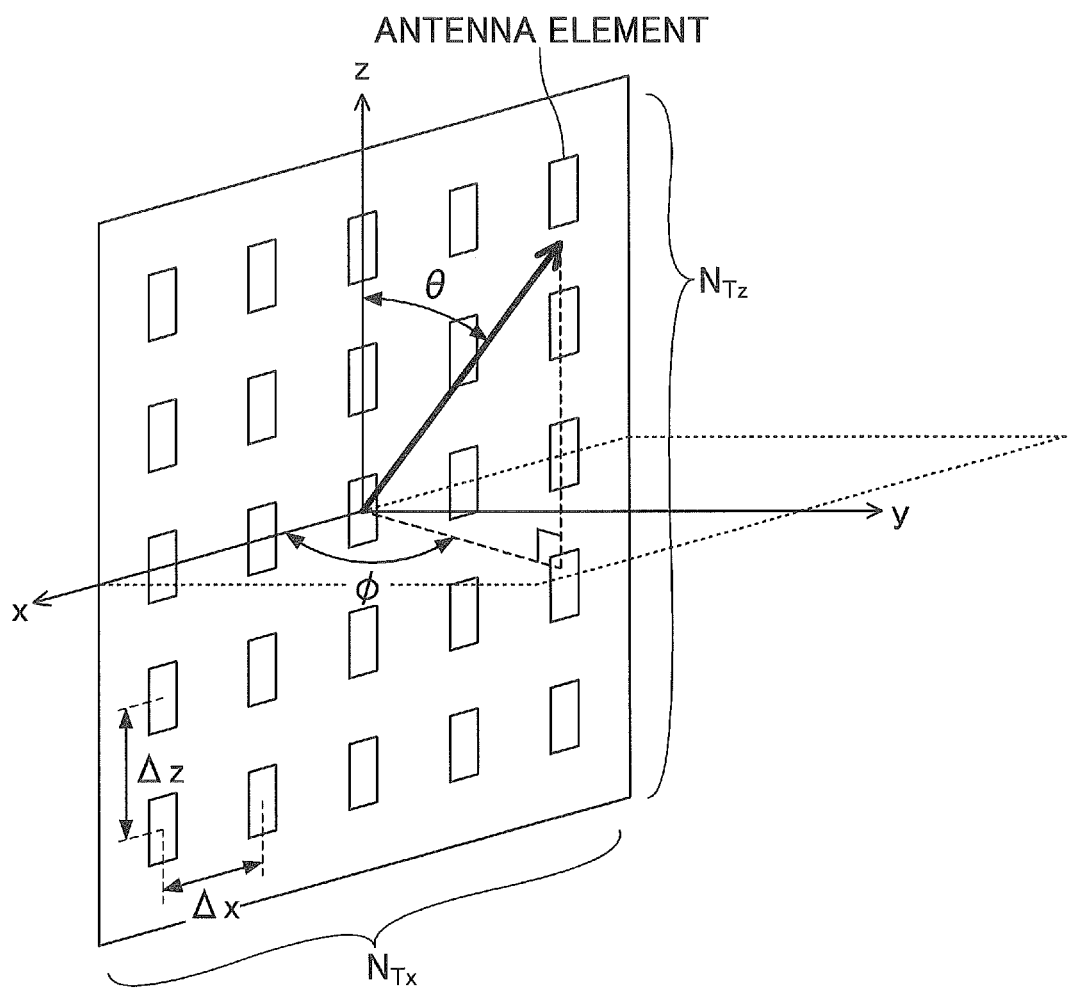
FIG. 13 is a diagram illustrating beam angles with respect to a planar array.

$w_l = w(n_\phi^{opt}\Delta\phi, n_\theta^{opt}\Delta\theta)$: Steering vectors in directions of $\phi$ and $\theta$
$s_l(n)$: Initial discovery signal
$n_\phi = 0 \sim N_\phi - 1$, $n_\theta = 0 \sim N_\theta - 1$
$N_\phi = 180°/\Delta\phi$, $N_\theta = 180°/\Delta\theta$
$w_l \neq w_{l-1} \neq \ldots \neq w_l$ As illustrated in FIG. 13, $\phi$ and $\theta$ in Formula (1) indicate a beam angle ($\phi$) in an xy plane (with respect to the antenna plane in the horizontal direction) and a beam angle ($\theta$) in a yz plane (with respect to the antenna plane in the vertical direction). "W" is a steering vector of "the number of transmitting antenna elements"×1 indicating a weight amount by which each antenna element is multiplied in the phase control unit 1012 in order to transmit the beams in directions of $\phi$ and $\theta$. "$\Delta\phi$" And "$\Delta\theta$" indicate intervals of the beam transmission directions in the horizontal direction and the vertical direction. For example, when the beams are transmitted at intervals of 10 degrees in the horizontal direction and the vertical direction, each of "Δφ" and "Δθ" is 10 degrees. "H" is a true channel, and "z" is noise. "opt" is an abbreviation for "optimal" and is given for the sake of convenience in order to indicate the transmission direction.

In step S103, the selecting unit 106 of the base station 1 selects a beam to be actually used for signal transmission from a plurality of initial beam candidates reported from the mobile station 4. Hereinafter, a "selected beam" is referred to as an "initial beam." The selecting unit 106 of the base station 1 may select "L" beams in the descending order of the reception power among the initial beam candidates reported from the mobile station 4 as the initial beams or further select beams whose reception power is a predetermined threshold value or more among the selected "L" initial beams as the initial beams. In the latter case, the base station 1 can prevent use of a beam whose reception power at the mobile station 4 side is too low and not suitable for communication. Then, the calculating unit 105 of the base station 1 decides a matrix in which the steering vectors "W" corresponding to the transmission directions of a plurality of selected initial beams are arranged as an initial BF weight matrix "$W_{ini}$." "$W_{ini}$" is a matrix of "the number of transmitting antenna elements"×"the number of initial beams."

In step S104, the signal transmitting unit 101 of the base station 1 transmits an orthogonalized reference signals using a plurality of initial beams. More specifically, the signal transmitting unit 101 sets the initial BF weight matrix "$W_{ini}$" in the phase control unit 1012 so that a beam is formed in respective directions of the initial beams, and transmits the reference signals corresponding to a plurality of initial beams. An arrangement example of the reference signals is specifically described with reference to FIG. 12. In FIG. 12, "R" indicates the number of initial beams. When the "L" initial beams are selected in the processing procedure of step S103, "R"="L" is held. In FIG. 12, "Q" indicates a subcarrier interval at which the reference signal corresponding to one initial beam is repeatedly mapped. For example, in the example of FIG. 12, three resources at positions of "h" are illustrated, but it indicates that in the three resources, the same reference signal is transmitted through the beams in the same direction. The same applies to resources at positions of "I," "m," and "n."

"Q" can be any interval but is preferably a number by which frequency selectivity of a channel can be reproduced (by which a sampling theorem is satisfied) so that at least the mobile station 4 can complement the channel estimation value in all subcarriers.

When "Q" is smaller than the number of "R," the reference signal corresponding to the initial beam is time-multiplexed at timings of "R"/"Q" so that the orthogonalized reference signal is transmitted in all the transmission directions of the initial beams. For example, if the number of initial beams is 36, and "Q" is 4, the base station 1 transmits the reference signals corresponding to all the initial beams by using nine OFDM symbols.

Further, a subcarrier, a timing, and an initial beam used for transmission of the reference signal are decided in advance between the base station 1 and the mobile station 4. For example, the base station 1 and the mobile station 4 may hold a table indicating a subcarrier, a timing, and an initial beam used for transmission of the reference signal in common, or a notification of a subcarrier, a timing, and an initial beam used for transmission of the reference signal is given from the base station 1 to the mobile station 4 through the base station 2 of the macro cell.

In step S105, the measuring unit 203 of the mobile station 4 receives the reference signal corresponding to the initial beam and performs channel estimation using the received reference signal. Further, the notifying unit 204 of the mobile station 4 notifies the base station 1 of the channel information. As described above in step S104, since the reference signal is multiplied by the initial BF weight matrix "$W_{ini}$" and transmitted, the channel estimated by the mobile station 4 is the channel multiplied by the initial BF weight.

In step S106, using the channel information reported from the mobile station 4, the calculating unit 105 of the base station 1 generates a pre-coding matrix to be used when the user data is transmitted. The calculating unit 105 can generate the pre-coding matrix by any method. For example, the calculating unit 105 may generate the pre-coding matrix using block diagonalization or an eigenmode technique or may select the pre-coding matrix corresponding to the channel estimation value from a code book which is prepared in advance.

In step S107, the signal transmitting unit 101 of the base station 1 transmits the orthogonalized update discovery signal through the beams having intervals smaller than the initial beams (for example, intervals of 5 degrees) in a plurality of transmission directions within a predetermined range from the transmission directions of a plurality of initial beams. A direction in which the update discovery signal is transmitted and the number of beams can be selected by any method. For example, if it is assumed that there are four initial beams, and the four initial beams are transmitted in the horizontal direction and the vertical directions at intervals of 10 degrees as illustrated in FIG. 6A, the signal transmitting unit 101 may transmit the update discovery signal in directions which are shifted, for example, by 5 degrees (intervals which are half the intervals of the initial beams) in the horizontal direction and/or the vertical direction, respectively, centering on the transmission directions of the four initial beams, as illustrated in FIG. 6B.

The signal transmitting unit 101 of the base station 1 may transmit the update discovery signal only in the transmission directions within a predetermined range from the initial beams whose reception power is a predetermined threshold value or more among the initial beams. It is because although the reception power (the reception power of the update discovery signal) in the mobile station 4 is considered to be low even though the update discovery signal is transmitted around the transmission direction of the initial beam candidate with the low reception power.

Here, the base station 1 can transmit the "L" beams at the same time, but there may be a case where the number of update discovery signals to be transmitted is smaller than "L." In this case, when the update discovery signal is transmitted, the signal transmitting unit 101 of the base station 1 frequency-multiplies the user data multiplied by the pre-coding matrix generated in the processing procedure of step S106 and the update discovery signal and then transmits a resulting data.

An arrangement example of the update discovery signals and the user data is specifically described with reference to FIG. 12. As illustrated in FIG. 12, the signal transmitting unit 101 maps a plurality of update discovery signals to be transmitted in different directions to different subcarriers, maps the user data to be sandwiched between the update discovery signals, and transmits the resulting data. Further, the signal transmitting unit 101 repeatedly maps a plurality of update discovery signals to be transmitted in different directions to predetermined subcarriers above and below a band. The example of FIG. 12 is merely an example, and the subcarrier to which the update discovery signal is mapped need not be necessarily above or below the band. For example, the subcarrier to which the update discovery signal is mapped may be a subcarrier within a predetermined range of the band. A subcarrier, a timing, and a direction sued for transmission of the update discovery signal are decided in advance between the base station 1 and the mobile station 4. For example, the base station 1 and the mobile station 4 hold a table indicating a subcarrier, a timing, and a direction sued for transmission of the update discovery signal in common. The mobile station 4 can detect the direction in which the received update discovery signal is transmitted by comparing the subcarrier and the timing in which the update discovery signal is received with the table.

Further, the signal transmitting unit 101 sets the initial BF weight matrix "$W_{ini}$" in the phase control unit 1012 in advance, and sets a pre-coding vector for an angle offset for transmitting the update discovery signal in a desired direction in the pre-coding processing unit 1011 in advance, and performs control such that each of a plurality of update discovery signals is transmitted in a desired direction. In other words, the signal transmitting unit 101 uses, in order to transmit an update discovery signal in a desired direction, a pre-coding vector for an angle offset for adding, to the transmission direction of the initial discovery signal, an angle corresponding to a difference in transmission angles between the transmission angle of the initial discovery signal and the desired direction, and the weight matrix corresponding to the transmission direction of the initial discovery signal (the initial BF weight matrix), so as to transmit each of a plurality of update discovery signals in a desired direction using both the analog BF and BF based on digital processing. Here, the pre-coding vector (v) for the angle offset for transmitting the update discovery signal in a desired direction can be generated using the following Formula (2). In Formula (2), a steering vector in a direction in which a search is desired to be performed is a vector configured with elements indicating weights for transmitting a plurality of update discovery signals in desired directions, respectively. Further, the generated pre-coding vector "v" for the angular offset is a vector configured with elements indicating weights by which a plurality of update discovery signals are multiplied, respectively. "can" is an abbreviation for candidate and is given for the sake of convenience in order to indicate a search direction.

[Math. 2]

$$v = W_{ini}^H (W_{ini} W_{ini}^H)^{-1} \underbrace{w(\phi_{can}, \theta_{can})}_{\substack{\text{steering vector in direction} \\ \text{in which search is} \\ \text{desired to be performed}}} \quad \text{Formula (2)}$$

FIG. 14 is a diagram for describing a signal processing method when the update discovery signal and the user data are frequency-multiplexed and transmitted. As illustrated in FIG. 14, the pre-coding processing unit 1011 generates a frequency domain signal of each beam by multiplying a plurality of update discovery signals to be transmitted in the subcarriers illustrated in FIG. 12 by the pre-coding vectors (v) for the angular offset and multiplying the user data to be transmitted in the subcarriers illustrated in FIG. 12 by the pre-coding matrix obtained in the processing procedure of step S106. The frequency domain signal of each beam is converted into a time domain signal through IFFT, further multiplied by a weight for each antenna element through the initial BF weight matrix "$W_{ini}$" set in the phase control unit 1012 in advance, and transmitted in a desired direction. The number of beams illustrated in FIG. 14 is intended to be a sum of the number of update discovery signals to be transmitted and the number of streams for transmitting the user data. For example, when the update discovery signals of 16 directions and the user data of two streams are transmitted, the number of beams illustrated in FIG. 14 is 18.

In step S108, the measuring unit 203 of the mobile station 4 receives the update discovery signal transmitted from the base station 1, and measures the reception power of the received update discovery signal (more specifically, an average of the reception power of a plurality of subcarriers to which the same update discovery signal is mapped). Further, the notifying unit 204 notifies the base station 1 of information indicating the measured reception power of the update discovery signal and the direction in which the measured update discovery signal is transmitted in the descending order of the reception power. For example, when the mobile station 4 receives four update discovery signals, the mobile station 4 notifies the base station 1 of information indicating the reception power and the transmission direction of each of the four update discovery signals. The mobile station 4 may notify the base station 1 of the information indicating the reception power and the transmission method through the base station 2 of the macro cell. Hereinafter, a plurality of beams in the reception power order reported from the mobile station 4 are referred to as "updated beam candidates."

In step S109, the selecting unit 106 of the base station 1 selects the beam to be actually used for data transmission from the updated beam candidates reported from the mobile station 4. Hereinafter, the selected beam is referred to as an "updated beam. The selecting unit 106 of the base station 1 may select the "updated beam candidates" as the "updated beams" without change or may select a predetermined number of beams as the "updated beams" in the descending order of the reception power (the reception power reported from the mobile station 4). Further, the selecting unit 106 may select beams whose reception power is a predetermined threshold value or more from the updated beam candidates as the "updated beams. Thus, the base station 1 can prevent the beam whose reception power at the mobile station 4 side is too low and not suitable for communication from being used for data transmission.

Then, the calculating unit 105 decides a matrix in which the steering vectors "W" corresponding to the transmission directions of a plurality of updated beams are arranged as thane updated BF weight matrix "$W_{update}$." "$W_{update}$" is a matrix of "the number of transmitting antenna elements"× "the number of updated beams."

In step S110, the calculating unit 105 of the base station 1 calculates original channel information (a channel which is not multiplied by the initial BF weight) by multiplying the channel information reported from the mobile station 4 in step S105 by a pseudo inverse matrix of the initial BF weight matrix "$W_{ini}$," and calculates the channel information corresponding to the updated beam by multiplying the calculated original channel information by the updated BF weight matrix "$W_{update}$." Further, the calculating unit 105 generates (updates) the pre-coding matrix for data transmission from the channel information corresponding to the updated beams. A method similar to that of step S106 may be used as a method of generating the pre-coding matrix.

In step S111, the signal transmitting unit 101 of the base station 1 sets the pre-coding matrix updated in the processing procedure of step S110 in the pre-coding processing unit 1011, sets the updated BF weight matrix "$W_{update}$" in the phase control unit 1012, and transmits the user data through a plurality of streams.

A series of processing procedures from the transmission of the initial discovery signal to the transmission of the user data has been specifically described above.

<CONCLUSION>

As described above, according to the embodiment, there is provided a base station of a radio communication system including the base station and a mobile station that performs communication with the base station, the base station including a first discovery signal transmitter that transmits a plurality of first discovery signals in respective different transmission directions from the base station through beam forming; and a second discovery signal transmitter that transmits, for each of one or more first transmission directions of the plurality of transmission directions corresponding to one or more first discovery signals of the plurality of first discovery signals reported from the mobile station, second discovery signals in a respective plurality of second transmission directions, the plurality of second transmission directions being within a predetermined range from the first transmission direction, wherein, when each second discovery signal of the plurality of second discovery signals is to be transmitted, the second discovery signal transmitter transmits the second discovery signal by multiplying, by a correction precoding vector, the second discovery signal to be transmitted, the correction precoding vector being for adding, to the first transmission direction, a difference in transmission angles between the first transmission direction that is within the predetermined range from the second discovery signal and a second transmission direction of the second discovery signal to be transmitted, and by performing beam forming for the second discovery signal, the correction precoding vector being multiplied to the second discovery signal, using a first weight matrix for performing beam forming in the first transmission direction that is within the predetermined range from the second discovery signal. According to the base station 1, a technique is provided which allows a beam transmission direction to be efficiently searched for in a radio communication system supporting Massive MIMO.

Furthermore, the base station may include a reference signal transmitter that transmits one or more reference signals by performing beam forming in one or more transmission directions that are same as the respective one or more transmission directions corresponding to the one or more first discovery signals reported from the mobile station; an acquiring unit that acquires, from the mobile station, channel information that is estimated using the one or more reference signals; and a data transmitter that transmits user data to be transmitted to the mobile station using a precoding matrix for transmitting user data, the precoding matrix for transmitting user data being generated based on the channel information. In this manner, the base station 1 can transmit the user data using the beam determined by the first beam search.

Further, the data transmitter may frequency-multiplex and transmit the user data to be transmitted to the mobile station and the plurality of second discovery signals. In this manner, the base station 1 can efficiently use the radio resources and reduce the transmission delay of the user data.

Further, the data transmitter may generate updated channel information by multiplying the channel information by an inverse matrix of the first weight matrix and by a second weight matrix for performing beam forming in the transmission direction of the second discovery signal reported from the mobile station of the plurality of second discovery signals, and transmit the user data to be transmitted to the mobile station using a precoding matrix for transmitting user data generated based on the updated channel information. In this manner, the user data can be transmitted using a beam in a more accurate direction, and the stability and throughput of communication can be enhanced.

The first discovery signal transmitter may transmit the plurality of first discovery signals at angles having predetermined intervals in a horizontal direction and a vertical direction with respect to an antenna plane, and the second discovery signal transmitter may transmit the second discovery signals at angles having intervals smaller than the angles having the predetermined intervals in the horizontal direction and the vertical direction with respect to the antenna plane within a predetermined range from the transmission directions of the first discovery signals reported from the mobile station. In this manner, the base station 1 can transmit the update discovery signal at finer angles and search for a more accurate beam transmission direction.

The first discovery signal transmitter may map the plurality of first discovery signals to different subcarriers and transmit the first discovery signals, and the second discovery signal transmitter may map the plurality of second discovery signals to different subcarriers and transmit the second discovery signals. In this manner, the base station 1 can transmit a plurality of initial discovery signals and an update discovery signal at the same timing, so that search for the beam transmission direction can be performed in a shorter time.

The first discovery signal transmitter may repeatedly map the plurality of first discovery signals to a plurality of subcarriers arranged at predetermined intervals and transmit the first discovery signals, and the second discovery signal transmitter may repeatedly map the plurality of second discovery signals to a plurality of subcarriers having predetermined intervals and transmit the second discovery signals. In this manner, when the reception power of the initial discovery signal and the reception power of the update discovery signal are measured, the mobile station 4 can feed a value obtained by averaging the reception power at a plurality of frequencies back to the base station 1 and measure the reception power more accurately.

The second discovery signal transmitter may apply the correction precoding vector to a precoder based on digital processing and apply the one or more first weight matrices for performing the beam forming in the respective one or more first transmission directions of the one or more first discovery signals reported from the mobile station, among the plurality of first discovery signals, to a phase shifter based on an analog circuit. In this manner, in the hybrid type massive MIMO base station, the updated discovery signal can be efficiently transmitted.

<Supplement of Embodiment>

As described above, the configurations of the devices (the base station 1 and the mobile station 4) described in the embodiment of the present invention may be implemented such that a program is executed by a CPU (processor) in a device having the CPU and a memory, may be a configuration implemented by hardware such as a hardware circuit equipped with a processing logic described in the present embodiment, or may be a combination of a program and hardware.

The exemplary embodiment of the present invention has been described above, but the disclosed invention is not limited to the above embodiment, and those skilled in the art would understand that various modified examples, revised examples, alternative examples, substitution examples, and the like can be made. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (provided that they do not contradict). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the sequences and the flowcharts described in the embodiment, the order may be changed as long as there is no inconsistency. For the sake of convenience of description, the base station 1 and mobile station 4 have been described using the functional block diagrams, but such devices may be implemented by hardware, software, or a combination thereof. Software executed by the processor included in the base station 1 according to the embodiment of the present invention and software executed by the processor included in the mobile station 4 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to Long Term Evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), and any other systems using an appropriate system and/or next generation systems extended on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

In the embodiment, the initial discovery signal is an example of a first discovery signal. The update discovery signal is an example of a second discovery signal. The signal transmitting unit 101 is an example of a first discovery signal transmitter, a second discovery signal transmitter, a reference signal transmitter, and a data transmitter. The precoding vector (v) for the angular offset is an example of a "correction pre-coding vector."

This international patent application is based upon and claims the benefit of priority of Japanese Patent Application No. 2016-048751 filed on Mar. 11, 2016, and the entire contents of Japanese Patent Application No. 2016-048751 are incorporated herein by reference.

LIST OF REFERENCE SYMBOLS 1, 2 base station
3 central control station
4 mobile station
101 signal transmitting unit
102 signal receiving unit
103 transmission signal generating unit
104 acquiring unit
105 calculating unit
106 selecting unit
201 signal transmitting unit
202 signal receiving unit
203 measuring unit
204 notifying unit
301 RF module
302 BB processing module
303 device control module
304 communication IF
311 analog BF circuit
401 RF module
402 BB processing module
403 UE control module
1011 pre-coding processing unit
1012 phase control unit

The invention claimed is:

1. A base station of a radio communication system including the base station and a mobile station that performs communication with the base station, the base station comprising:
a first discovery signal transmitter that transmits a plurality of first discovery signals in respective different transmission directions from the base station through beam forming; and
a second discovery signal transmitter that transmits, for each of one or more first transmission directions of the plurality of transmission directions corresponding to one or more first discovery signals of the plurality of first discovery signals reported from the mobile station, second discovery signals in a respective plurality of second transmission directions, the plurality of second transmission directions being within a predetermined range from the first transmission direction,
wherein, when each second discovery signal of the plurality of second discovery signals is to be transmitted, the second discovery signal transmitter transmits the second discovery signal by multiplying, by a correction precoding vector, the second discovery signal to be transmitted, the correction precoding vector being for adding, to the first transmission direction, a difference in transmission angles between the first transmission direction that is within the predetermined range from the second discovery signal and a second transmission direction of the second discovery signal to be transmitted, and by performing beam forming for the second discovery signal, the correction precoding vector being multiplied to the second discovery signal, using a first weight matrix for performing beam forming in the first transmission direction that is within the predetermined range from the second discovery signal.

2. The base station according to claim 1, further comprising:
a reference signal transmitter that transmits one or more reference signals by performing beam forming in one or more transmission directions that are same as the respective one or more transmission directions corresponding to the one or more first discovery signals reported from the mobile station;
an acquiring unit that acquires, from the mobile station, channel information that is estimated using the one or more reference signals; and
a data transmitter that transmits user data to be transmitted to the mobile station using a precoding matrix for transmitting user data, the precoding matrix for transmitting user data being generated based on the channel information.

3. The base station according to claim 2,
wherein the data transmitter frequency-multiplexes and transmits the user data to be transmitted to the mobile station and the plurality of second discovery signals.

4. The base station according to claim 2,
wherein the data transmitter generates updated channel information by multiplying the channel information by an inverse matrix of the first weight matrix and by a second weight matrix for performing beam forming in the transmission direction of the second discovery signal reported from the mobile station, among the plurality of second discovery signals, and transmits the user data to be transmitted to the mobile station using a precoding matrix for transmitting user data generated based on the updated channel information.

5. The base station according to claim 1,
wherein the first discovery signal transmitter transmits the plurality of first discovery signals at angles having predetermined intervals in a horizontal direction and a vertical direction with respect to an antenna plane, and
the second discovery signal transmitter transmits the second discovery signals at angles having intervals smaller than the angles having the predetermined intervals in the horizontal direction and the vertical direction with respect to the antenna plane within a predetermined range from the transmission directions of the first discovery signals reported from the mobile station.

6. The base station according to claim 1,
wherein the first discovery signal transmitter maps the plurality of first discovery signals to different subcarriers and transmits the first discovery signals, and
the second discovery signal transmitter maps the plurality of second discovery signals to different subcarriers and transmits the second discovery signals.

7. The base station according to claim 6,
wherein the first discovery signal transmitter repeatedly maps the plurality of first discovery signals to a plurality of subcarriers arranged at predetermined intervals and transmits the first discovery signals, and
the second discovery signal transmitter repeatedly maps the plurality of second discovery signals to a plurality of subcarriers having predetermined intervals and transmits the second discovery signals.

8. The base station according to claim 1,
wherein the second discovery signal transmitter applies the correction precoding vector to a precoder based on digital processing, and applies the one or more first weight matrices for performing the beam forming in the respective one or more first transmission directions of the one or more first discovery signals reported from the mobile station, among the plurality of first discovery signals, to a phase shifter based on an analog circuit.

\* \* \* \* \*